United States Patent [19]

Becking, II

[11] Patent Number: 5,635,079

[45] Date of Patent: Jun. 3, 1997

[54] METHOD AND APPARATUS FOR FILTERING WATER WITH REDUCED SPILLAGE

[76] Inventor: Paul E. Becking, II, 6 Harbor Way #150, Santa Barbara, Calif. 93109

[21] Appl. No.: 506,466

[22] Filed: Jul. 24, 1995

[51] Int. Cl.[6] .................................................. C02F 1/28
[52] U.S. Cl. .......................... 210/767; 210/282; 210/266; 210/290; 210/429; 210/436; 210/472
[58] Field of Search ........................ 210/266, 282, 210/472, 436, 429, 660, 767, 807, 283, 290

[56] References Cited

U.S. PATENT DOCUMENTS

| | | | |
|---|---|---|---|
| 98,343 | 12/1869 | Boyce | 210/472 |
| 498,967 | 6/1893 | Benham | 210/472 |
| 1,052,391 | 2/1913 | Valerius et al. | 210/472 |
| 1,292,737 | 1/1919 | Endreson | 210/136 |
| 1,694,804 | 12/1928 | Turner | 210/136 |
| 2,167,225 | 7/1939 | Van Eweyk | 210/282 |
| 2,222,123 | 11/1940 | Schwab | 210/282 |
| 2,389,185 | 11/1945 | Dick | 210/472 |
| 3,038,610 | 6/1962 | Hetherington | 210/282 |
| 3,342,340 | 9/1967 | Shindell | 210/283 |
| 3,529,726 | 9/1970 | Keenan | 210/266 |
| 3,679,054 | 7/1972 | Muller | 210/266 |
| 3,782,549 | 1/1974 | Muller | 210/449 |
| 3,802,563 | 4/1974 | Sasaki et al. | 210/472 |
| 4,024,991 | 5/1977 | Tyson et al. | 210/474 |
| 4,306,971 | 12/1981 | Hankammer | 210/472 |
| 4,749,484 | 6/1988 | Greenhut | 210/266 |
| 4,800,018 | 1/1989 | Moser | 210/282 |
| 4,826,594 | 5/1989 | Sedman | 210/290 |
| 4,885,089 | 12/1989 | Hankammer | 210/472 |
| 4,895,648 | 1/1990 | Hankammer | 210/188 |
| 4,978,449 | 12/1990 | Devine et al. | 210/264 |
| 5,122,272 | 6/1992 | Iana e al. | 210/473 |
| 5,126,044 | 6/1992 | Magnusson et al. | 210/282 |
| 5,238,559 | 8/1993 | Nieweg | 210/264 |
| 5,240,620 | 8/1993 | Shalev | 210/282 |
| 5,273,654 | 12/1993 | Magnusson et al. | 210/232 |

*Primary Examiner*—Cynthia L. Nessler
*Attorney, Agent, or Firm*—LaRiviere, Grubman & Payne

[57] ABSTRACT

Method for filtering treated water and apparatus to practice the method. The method taught herein consists of filling a first container with water, attaching a special filter apparatus thereto and finally attaching a second, empty bottle to the filter apparatus. When the conjoined containers and filter apparatus are inverted, the water in the first container, now atop the filter apparatus passes through that apparatus and into the second container under the impetus of gravity. Air displaced from the second container by the transfer of water therein is exchanged into the first container by means of a vent located in the body of the filter apparatus. The apparatus taught herein comprises a filter body having disposed within the previously discussed vent, at least one filter element and a check valve to preclude the unwanted re-filtration of previously filtered water. The apparatus further provides for the secure attachment to the two containers for sealing therewith, thereby precluding leakage from the conjoined filter and containers during filtration.

19 Claims, 2 Drawing Sheets

5,635,079

METHOD AND APPARATUS FOR FILTERING WATER WITH REDUCED SPILLAGE

TECHNICAL FIELD

The present invention relates to a method for filtering water and the apparatus to perform that method. More particularly, the present invention teaches a low cost water purifying apparatus into which is threadably received a pair of containers. Furthermore, the present method provides a water purifying apparatus which, if upset, reduces or eliminates the spillage of water from the bottles or the apparatus itself.

BACKGROUND ART

Producing an inexpensive yet effective water filtering apparatus has been the goal of many workers. One such early attempt utilizing a filter apparatus threadably attachable to one bottle and into which a second bottle may be inserted is taught by U.S. Pat. No. 2,167,225 to Van Eweyk. The water filtering apparatus taught by Van Eweyk comprises a cylindrical apparatus having a threaded aperture at one end for threadably attaching to a bottle or similar container. The upper end of the filtering apparatus of Van Eweyk is open, whereby the neck of a second bottle may be received therein, the second bottle being retained in the apparatus by gravity. The apparatus contains a quantity of water purifying media through which water passing from the second or upper bottle flows through the media and thence into the lower or first bottle.

A somewhat similar device is disclosed in U.S. Pat. No. 5,240,620 to Shalev. Shalev teaches an apparatus for filtering water comprising an enclosure containing a quantity of filter media. The enclosure of Shalev is fitted with an entrance and an exit spout, at least one of which is dimensioned to be received into the neck of a receiving container such as a bottle. In use, the filtering apparatus of Shalev has its entrance spout inserted into an upright bottle of water and a second bottle is placed over the exit spout. A user then holds the filter between the two bottles while inverting them, and gravity urges water from the first bottle into the second. Shalev recognizes the likelihood of water spillage from such a device and therefore provides a damn or buffer to receive water excess to the filtration process.

Neither the device of Shalev nor of Van Eweyk recognizes the importance of providing a dedicated air passage to ensure passage of displaced air from the lower container to the upper container. Such an air passage or vent will serve to ensure an efficient and timely transfer of water from the upper container to the lower. U.S. Pat. Nos. 4,749,484 and 4,978,449 make such provision.

The '484 patent to Greenhut teaches a filter apparatus for insertion into a two-chambered container wherein the chambers of the container are positioned one atop the other. As water flows under gravity through the filter, air is displaced from the lower chamber to the upper. In order to ensure the free passage of this air, Greenhut teaches two methodologies. First, Greenhut does not position a preliminary filter directly on top of his primary filter material, maintaining that bubbles formed during the filtering process could block the flow of water through the primary filter in an unpredictable manner. Secondarily, Greenhut provides a secondary vent having a lower end opening into the top of the lower vessel thereby receiving air displaced during filtration. This vent tube has an upper end defining a hole near the upper end of the upper vessel for venting air therein.

The '449 patent to Devine et al. is a further improvement to the filter apparatus taught by Greenhut. Devine et al. teach a single air vent positioned above the mass of filter media, the vent having a retainer therein which allows air to pass up through the air passage or vent while limiting, but not eliminating, movement of the filter material out of the housing should the water filter be inverted.

Both the Van Eweyk and Shalev patents rely on gravity to maintain the bottles and filter in their relative positions during use. It will be immediately apparent therefore that any disturbance of this apparatus, or substantial blockage of the filter would likely lead to significant spillage. In order to optimally improve the taste of municipally treated water and to improve its safety after transport in metallic pipes, particularly soldered pipes, a filtering system having two active filter elements is preferred. The combination of activated carbon to reduce chlorine as well as other off tastes and odors, and a cationic exchange resin to remove lead and other heavy metals has proven particularly advantageous. This fact is recognized by the teachings of Devine et al. who further point out the desirability of not admixing large amounts of the ion exchange material with the relatively fine carbon grains.

In order to minimize the admixture of filter media during shipment, while enabling a reasonably efficient transfer of air from the lower bottle to the upper, Devine et al. teach an air space above the ion exchange material at the top of which is a water and air permeable retainer. The retainer keeps the ion exchange material in the filter apparatus, and limits but does not eliminate the movement and hence the admixture of the two active elements. The air space above the ion exchange material is necessary in the apparatus of Devine et al. in order to allow the upward flow of air to start and then to continue as water flows through the filter. Without such an air space formed by the air passage, the first quantity of air released from the water flowing through the filter creates an air pressure which prevents further flow of water through the filter.

What is needed is a low-cost, efficient water filtration unit which is securely attachable to, and which seals to two containers to eliminate or significantly reduce water spillage during use. In order to make such a filtration unit efficient, two obstacles must be overcome. First, a methodology must be found to enable the orderly transfer of water from the upper container to the lower, and the concomitant simultaneous transfer of air from the lower to the upper. Second, a methodology must be found for preventing the admixture of the active filtration elements during the repeated inversions occasioned by the use of such a filtration unit.

DISCLOSURE OF INVENTION

The present invention teaches a method for filtering treated water by means of a low-cost, efficient water filtration unit which is securely attachable to, and which seals with two containers, such as plastic beverage bottles. This filtration unit eliminates or significantly reduces water spillage during use. The filtration unit attaches to the containers by means of threaded connectors or other attachment methods well known to those of ordinary skill in the art.

In use, the filtration unit is attached to a first bottle filled with water, for instance water from a municipal water supply which has been treated with chlorine for safety purposes. A second, empty bottle is then attached to the opposite end of the unit. The conjoined filter and bottles are then inverted, and the water flows under the impetus of gravity from what is now the upper, water filled bottle to the lower bottle. Upon completion of filtration, substantially all the water from the upper bottle is stored in the lower, and the air from the lower bottle has been transferred to the upper.

To provide for the order exchange of the air and water between the two bottles in the sealed filtration system of the present invention, a vent is provided which ensures this uninterrupted counterflow. The vent is disposed within the filter body, and is at least partially insertable into one of the containers when that container is attached to the filter body. The vent further enables the use of at least one mechanical filter which maintains the active filter media in their proper positions without unwanted admixture.

Finally, a check valve is provided to prevent the re-transfer of filtered water back into the first bottle should the user inadvertently re-invert the conjoined filter and bottles after filtration.

Other features of the present invention are disclosed or apparent in the section entitled: "BEST MODE FOR CARRYING OUT THE PRESENT INVENTION."

BRIEF DESCRIPTION OF DRAWINGS

For fuller understanding of the present invention, reference is made to the accompanying drawing in the following detailed description of the Best Mode of Carrying Out the Present Invention. In the drawing:

FIG. 1A is a cut-away view of a first container receptacle.
FIG. 1B is a cut-away view of a second container receptacle.

Figure 1:
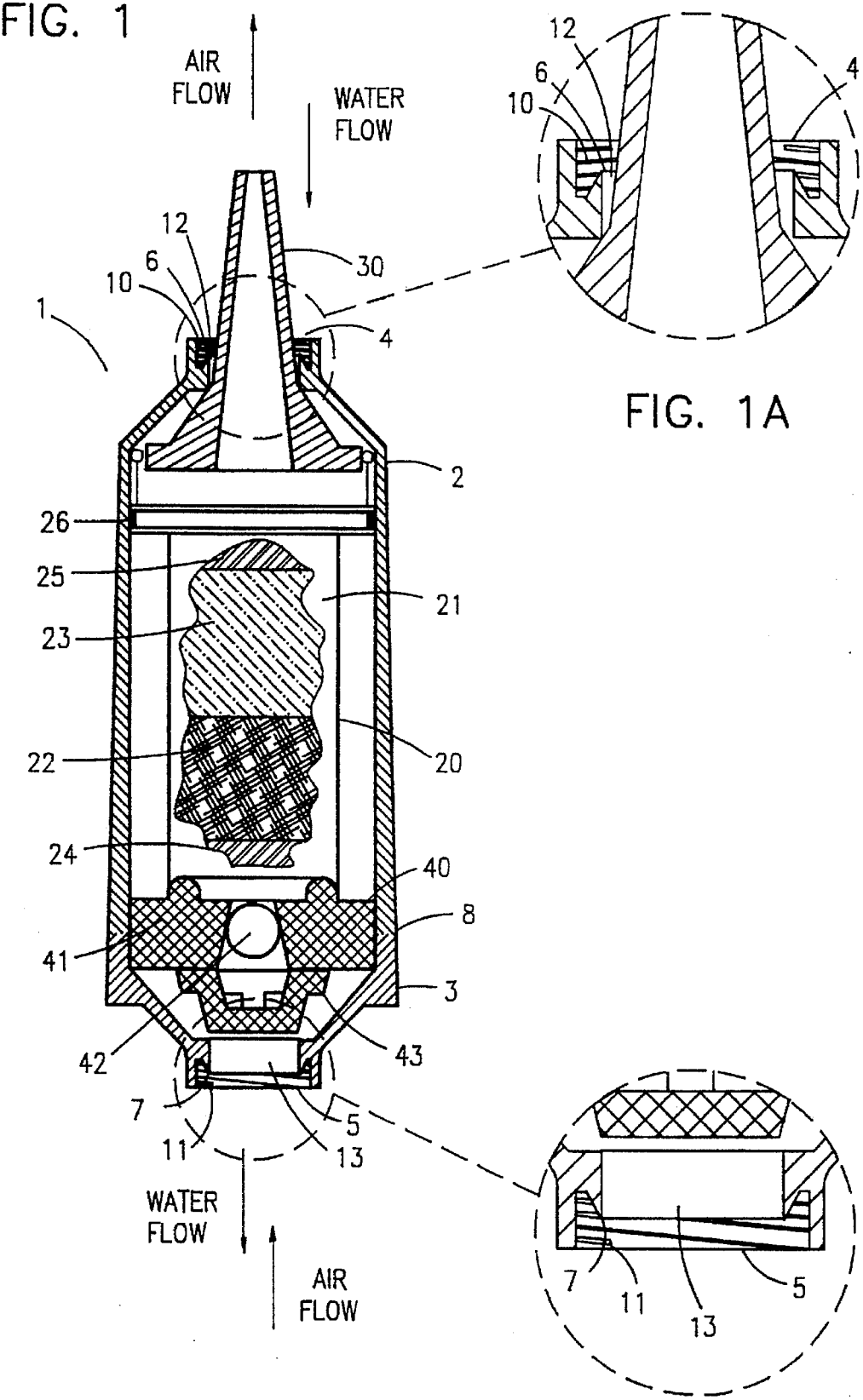
FIG. 1 is a cut-away view of the filter apparatus of the present invention.

Reference numbers refer to the same or equivalent parts of the present invention throughout the several figures of the drawing.

BEST MODE FOR CARRYING OUT THE PRESENT INVENTION

Referring now to FIG. 1, a vertical cross section of the filter apparatus of the present invention is shown. Filter apparatus 1 includes a hollow, substantially cylindrical body 1. Filter body 2 surrounds and encloses therein filter cartridge 20 and check valve assembly 40. Check valve 40 is may be downstream from filter cartridge 20 to prevent the reverse flow of previously filtered water through filter cartridge 20. Filter body 2 further captures and retains vent 30 therein. Filter cartridge 20, vent 30, and check valve assembly 40 are retained in filter body 2 by means of end cap 3. Filter body 2 and end cap 3 each define a cylindrical receptacle, 4 and 5 respectively, which further defines internal threads for engaging a pair of threaded containers such as bottles (not shown), and which define a water inlet 12 and an outlet 13. End cap 3 may be permanently or reversibly attached to filter body 2. In the preferred embodiment of the present invention, end cap 3 is permanently attached to filter body 2 by means of ultrasonic welding. Alternatively, mechanical, solvent, adhesive or other attachment means, well known to those of ordinary skill in the art, may be implemented with equal facility to permanently effect this attachment. As a further alternative, threaded or other reversible attachment means may be used to attach end cap 3 to filter body 2. Such reversible attachment enables the re-filling of the apparatus.

Referring now to FIGS. 1A and 1B, the two receptacles 4 and 5 are shown. Each of receptacles 4 and 5 is fitted with internal threads 10 and 11, respectively, for threadably engaging the necks of threaded containers. Further, each receptacle defines a hollow tapered plug numbered 6 and 7 respectively, for sealing the mouths of the bottles to which filter assembly 1 is threaded. As filter assembly 1 is threaded onto each of the bottles, plugs 6 and 7, respectively, engage and seal the bottles to the filter assembly. Alternative sealing methodologies, including but not limited to gaskets and O-rings may be implemented with equal facility, and without departing from the teachings of the present invention.

Having continued reference to FIG. 1, retained within filter body 2, and downstream from vent 30, is filter cartridge 20, comprising a cartridge body 21 which retains the several filtering elements of the cartridge therein. In the preferred embodiment of the present invention, there are two active filter elements or media and two mechanical filter elements or media. Activated carbon 22 removes chlorine and taste elements. Overlying activated carbon 22 is ion exchange resin 23 which removes, by cationic exchange, dissolved metals from the water. Activated carbon 22 and ion exchange resin 23 are retained within cartridge body 21 by means of a pair of mechanical filters 24 and 25 in substantial contact with, and which overlay and underlay respectively active filter elements 22 and 23. In this manner, mechanical filters 24 and 25 provide mechanical pre- and post-filtration respectively. Alternatively, the several filter elements to the present invention may be implemented directly within filter body 2, without the necessity for a separate filter cartridge. Where the filter cartridge feature found in the preferred embodiment of the present invention is utilized, cartridge body 21 is sealed within filter body 2 by means of O ring 26 and held in place by check valve assembly 40 in operative combination with end cap 3.

Figure 3:
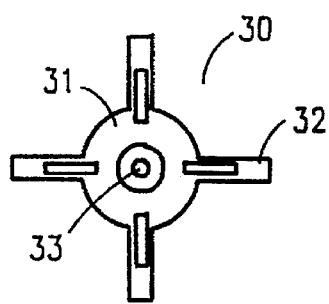
FIG. 3 is an end view of the vent.

End cap 3 and filter body 2 are joined at seam 8 by any of several means well known to those of ordinary skill in the art. In the preferred embodiment of the present invention, it is contemplated that end cap 3 be sealed to filter body 2 by means of ultrasonic welding. Other means of adhesive or mechanical connection may with equal facility be implemented when practicing the principals of the present invention. Furthermore, the present invention may be made refillable by means of forming joint 8 through threaded fastening or other removable or releasable mechanical means well known to those skilled in the art. Referring now to FIG. 3, one arrangement of arms 30 on vent body 31 is shown.

Figure 2:
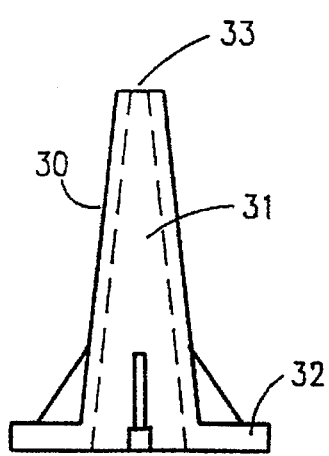
FIG. 2 is a side view of the vent of the present invention.

Referring now to FIGS. 2 and 3, vent 30 of the present invention is disclosed. Vent 30 comprises vent body 31. Vent body 31 is in the form of a hollow frustum of a cone and has disposed about its lower end a plurality of outwardly extending arms 32 for maintaining alignment of vent 30 within filter body 2. Vent 30 is retained in a vertical position, and in substantial axial alignment in filter body 2 by filter cartridge 20.

Figure 4:
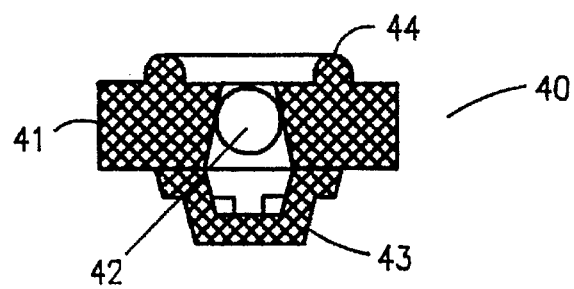
FIG. 4 is a vertical section of the check valve assembly of the present invention.

Referring to FIG. 4, check valve assembly 40 is detailed. Check valve assembly 40 comprises valve body 41, check valve 42, and retainer 43. Valve body 41 defines therein a substantially tapered passage 45. Disposed within passage 45 is spherical check valve 42. Check valve 42, whose diameter is smaller than the narrow end of passage 45, but larger than the wider end of passage 45, is retained within that passage by means of retainer 43. Retainer 43 is provided with at least one aperture to enable the passage of air and water therethrough. Further disposed on valve body 41 is lip 44 for engaging one end of cartridge body 21 (not shown), and for maintaining cartridge body 21 in alignment with filter body 2 (not shown).

Figure 5:
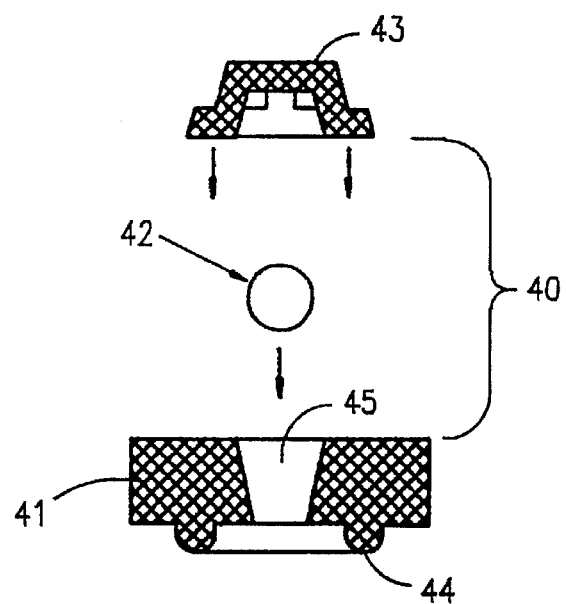
FIG. 5 is an exploded assembly cross-section of the check valve assembly of the present invention.

A cut-away assembly drawing of check valve assembly 40 is shown in FIG. 5. Check valve 42 is first inserted into conical passage 45. After check valve 42 is inserted into passage 45, retainer 43 is assembled to valve body 41, for instance by ultrasonic welding, thereby capturing and retaining check valve 42 therein.

The several parts of the present invention are formed of materials approved for contact with food and water systems, for instance as defined in 21 C.F.R. §§ 175–179. In forming the preferred embodiment apparatus of the present invention, it is anticipated that the several parts thereof generally be formed of polyoxymethylene copolymers. One such copolymer is manufactured and sold by E. I. Dupont as "Delrin". Check valve 42 may be formed of stainless steel, and O ring 26 of rubber or other polymer approved for indirect food contact. Alternative materials may, with equal facility be implemented.

The method of the present invention is practiced as follows: A bottle, for instance a polycarbonate beverage bottle, is filled with treated tap water and the filter assembly of the present invention is attached thereto by threadably engaging threaded neck of the bottle with threaded receptacle 4, and sealing the neck with conical seal 6, as shown in FIG. 1. A second, empty bottle of similar size and configuration is likewise threaded into second receptacle 5 and sealed with conical seal 7 of filter assembly 1 of the present invention. The conjoined assembly, now consisting of two bottles having filter assembly 1 threadably attached therebetween, is then inverted and gravity urges the flow of the water from the upper bottle through filter assembly 1 of the present invention to the lower bottle.

Having continued reference to FIG. 1, the advantage of vent 30 will be discussed. A methodology for insuring the efficient exchange of water and air in water filtration units is an important factor in determining the filter unit's efficiency and ease of use. Important even in the unsealed filtration systems previously discussed, this orderly transfer is even more important in a sealed filtration unit of the type taught by the present invention. Vent 30 provides for this orderly exchange of air and water during the filtration process in the following manner: As the water in the upper bottle flows through inlet 12 into the interior of filter assembly 1, the air displaced from the lower bottle is exhausted through spout 33 of vent 30. This occurs because spout 33 provides a lower differential head pressure for the water than the water at inlet 12. It should be noted that by altering the diameter of spout 33 as well as the overall length of vent 30, the transfer rate of air from the lower bottle (not shown) to the upper bottle (not shown) can be in some degree controlled.

In the event a combination of the filter assembly of the present invention threadably attached to two bottles is dislodged or disturbed, their threaded and secure connection further provides advantages in convenience over the cited references. A further advantage of the present invention to containing spillage is embodied in check valve 40 having continued reference to FIG. 1. In the event that the filter apparatus of the present invention is inadvertently inverted with a full bottle attached to outlet 13, check valve 42 seated within conical passage 45 will eliminate or dramatically reduce any unwanted reverse flow through the apparatus of the present invention.

Having continued reference to FIG. 1, a further advantage of the present invention is discussed. The active filter elements, ion exchange resin 23, and activated carbon 22 are retained separately and in juxtaposition by upper and lower mechanical filters 24 and 25. This presents the advantage of dual active filtration not contemplated by Greenhut and provided by Devine et al. while precluding the unwanted movement of the several filter elements occasioned by the repeated inversion of the filter assembly. This repeated inversion would lead to the displacement and admixture of the various filter elements thereof as discussed in Devine et al. were it not for the upper and lower mechanical filters 24 and 25. The use of upper mechanical filter 25 to retain the active filter elements of the present invention is enabled and perfected by use of vent 30 for ensure efficient simultaneous transfer of water from the upper bottle to the lower and air from the lower bottle to the upper, thereby overcoming the problems discussed in Devine et al.

It will be immediately apparent to those of ordinary skill in the art that the principals of the present invention may, with equal facility, be implemented using a wide variety of alternative materials, filter elements, check valve and vent configurations. The present invention specifically contemplates all such alternatives.

The present invention has been particularly shown and described with respect to certain preferred embodiments and features thereof. However, it should be readily apparent to those of ordinary skill in the art that various changes and modifications in form and detail may be made without departing from the spirit and scope of the inventions as set forth in the appended claims. The inventions illustratively disclosed herein may be practiced without any element which is not specifically disclosed herein.

I claim:

1. A method for filtering treated water from a first container into a second container, said first and said second containers each including a threaded neck portion, said method comprising the steps of:

forming a hollow, substantially cylindrical filter body;

disposing a first receptacle means at a first end of said filter body, said first receptacle means for receiving therein and for threadably engaging the threaded neck portion of said first container, said first receptacle means having a first container seal disposed therein;

disposing a second receptacle means at a second end of said filter body, said second receptacle means for receiving therein and for threadably engaging the threaded neck portion of said second container, said second receptacle means having a second container seal disposed therein;

disposing a vent means within said filter body for defining a simultaneous communication path for water from said first container through said filter body and to said second container and for air from said second container through said filter body to said first container, thereby effecting the efficient exchange of water and air between said first and said second containers during filtration, said vent means further comprising a hollow conical structure disposed coaxially within said filter body above said filter element, said wider end proximal to said filter element and said narrower end extending through said first receptacle means and insertable into said first container, said hollow conical structure further defining a tapered tube having a wider end and a narrower end disposing a filter element within said filter body;

filling a first container with water;

attaching said first container to said first receptacle and sealing said first container to said filter body with said first container seal;

attaching a second container to said second receptacle and sealing said second container to said filter body with said second container seal; and inverting said first container, said second container and said filter body as a unit and allowing said water to flow from said first container through said filter element and into said second container.

2. A water filtration apparatus comprising:

a hollow, substantially cylindrical filter body;

a first threaded receptacle disposed at a first end of the filter body, the first threaded receptacle suitably formed to threadably engage with and receive therein the threaded neck of a first container;

a second threaded receptacle disposed at a second end of the filter body, the second threaded receptacle suitably formed to threadably engage with and receive therein the threaded neck of a second container;

a first conical seal disposed within the first threaded receptacle, for sealing the threaded neck of the first container;

a second conical seal disposed within the second threaded receptacle, for sealing the threaded neck of the second container;

a hollow, conical vent partially disposed within the filter body, coaxial with the filter body, and extending partially outwardly from the first threaded receptacle and the first conical seal;

a filter cartridge further disposed within the filter body and substantially downstream from the vent;

a quantity of active filter media disposed within the filter cartridge;

a first mechanical filter further disposed within the filter cartridge and overlaying the active filter media, for providing mechanical pre-filtration and for retaining the active filter media in position within the filter cartridge;

a second mechanical filter further disposed within the filter cartridge and underlaying the active filter media, for providing mechanical post-filtration and for further for retaining the active filter media in position within the filter cartridge;

a filter seal for sealing the filter cartridge within the filter body; and a check valve assembly, further disposed within the filter body downstream from the filter cartridge, for preventing the reverse flow of water through the water filtration apparatus.

3. A water filtration apparatus which is securely attachable to a first and a second container, said apparatus and said first and said second containers, when assembled, forming a substantially air-tight and water-tight whole, said first and second second containers each having a neck, the apparatus comprising:

a hollow filter body;

first attachment means disposed on said filter body for attaching to and for receiving therein the neck of said first container;

second attachment means further disposed on said filter body for attaching to and for receiving therein the neck of said second container;

first container seal means disposed within said first attachment means;

second container seal means disposed within said second attachment means;

vent means, further disposed within said filter body and defining a first communication path for water from said first container to said second container and a second communication path for air from said second container to said first container; and a filter element further disposed within said filter body.

4. A water filtration apparatus which is securely attachable to a first and a second container, said apparatus and said first and said second containers, when assembled, forming a substantially air-tight and water-tight whole, said first and said second containers each having a neck, the apparatus comprising:

a hollow, substantially cylindrical filter body;

first receptacle means disposed at a first end of said filter body for attaching to and for receiving therein the neck of a first container;

second receptacle means disposed at a second end of said filter body for attaching to and for receiving therein the neck of a second container;

first seal means disposed within said first receptacle for sealing said filtration apparatus to said neck of said first container;

second seal means disposed within said second receptacle for sealing said filtration apparatus to said neck of said second container;

vent means disposed within said filter body for defining a simultaneous communication path for water from said first container to said second container and for air from said second container to said first container, thereby effecting the efficient exchange of water and air between said first and said second containers during filtration; and a filter element further disposed within said filter body.

5. The water filtration apparatus of claim 4 wherein said neck of said first and said second containers each comprise a threaded neck portion, said apparatus further comprising:

said first receptacle means including first thread means for engaging the threaded neck portion of said first container; and said second receptacle means including second thread means for engaging the threaded neck portion of said second container.

6. The water filtration apparatus of claim 4 wherein at least one of said first and said second seal means further comprises a hollow, tapered plug.

7. The water filtration apparatus of claim 4 further comprising a check valve means further disposed within said filter body for preventing the reverse flow of water through said water filtration apparatus.

8. The water filtration apparatus of claim 7 further comprising a seal for sealing said filter element within said filter body.

9. The water filtration apparatus of claim 4 wherein said filter element further comprises:

an active filter media disposed within said filter body; and a mechanical filter further disposed within said filter body.

10. The water filtration apparatus of claim 9 wherein said active filter media further comprises:

a quantity of ion exchange resin; and a quantity of activated carbon.

11. The water filtration apparatus of claim 9 wherein said mechanical filter further comprises:

a first mechanical filter for providing mechanical pre-filtration and for retaining said active filter media in position within said filter body; and a second mechanical filter for providing mechanical post-filtration and for further retaining, in operative combination with said first mechanical filter, said active filter media in position within said filter body.

12. The water filtration apparatus of claim 4 wherein said vent means further comprises:

a hollow conical structure defining a tapered tube having a wider end and a narrower end, said vent means further disposed coaxially within said filter body above said filter element, said wider end proximal to said filter element and said narrower end extending through said first receptacle means; and positioning means for maintaining said vent means in axial alignment with respect to said filter body.

13. The water filtration apparatus of claim 12 wherein said narrower end of said vent means is insertable into said first container.

14. The water filtration apparatus of claim 12 wherein said positioning means of said vent means further comprises a plurality of outwardly extending arms radially disposed about said wider end of said conical structure, said arms for engaging an inner surface of said filter body.

15. The water filtration apparatus of claim 4 wherein said check valve means further comprises:

a check valve body, defining a tapered passage therethrough;

a spherical check valve of larger diameter than the narrower end of said tapered passage, of smaller diameter than the wider end of said tapered passage, and introduced into said tapered passage; and a check valve retainer defining at least one aperture for the passage of air and water therethrough.

16. The water filtration apparatus of claim 15 wherein said filter body further comprises an end cap for enclosing said vent means, said filter element, and said check valve means within said filter body.

17. The water filtration apparatus of claim 16 wherein said end cap is permanently attached to said filter body.

18. The water filtration apparatus of claim 16 wherein said end cap is removably attached to said filter body.

19. The water filtration apparatus of claim 16 wherein said end cap is removably attached to said filter body by means of a threaded connection.

* * * * *